United States Patent [19]

Hashimoto

[11] 4,302,002
[45] Nov. 24, 1981

[54] SHEET TRANSPORTATION BELT APPARATUS

[75] Inventor: Hideo Hashimoto, Yokohama, Japan

[73] Assignee: Ricoh Company, Ltd., Tokyo, Japan

[21] Appl. No.: 54,708

[22] Filed: Jul. 5, 1979

[30] Foreign Application Priority Data

Jul. 14, 1978 [JP] Japan .................................. 53-97790

[51] Int. Cl.³ .......................... B65H 5/02; B65H 5/06
[52] U.S. Cl. .................................... 271/272; 198/814; 198/817; 271/274; 271/275
[58] Field of Search ............... 271/272, 273, 274, 275, 271/198, 188, 199–203, 280–286; 198/817, 814, 813, 842; 226/170, 171, 172

[56] References Cited

U.S. PATENT DOCUMENTS 1,192,832 7/1916 Sherman .......................... 198/817 X
3,120,384 2/1964 Fux ................................. 271/188 X
3,215,056 11/1965 Campbell ............................ 271/280
3,279,587 10/1966 Gray et al. ....................... 198/817 X
4,117,699 10/1978 Renaut ............................. 271/272 X Primary Examiner—Bruce H. Stoner, Jr.
Attorney, Agent, or Firm—Wyatt, Gerber, Shoup, Scobey & Badie

[57] ABSTRACT

The sheet transportation belt apparatus comprises a plurality of juxtaposed transportation belts trained over a plurality of guide rollers and a cylindrical member which is in pressure contact with the juxtaposed transportation belts and sheets are brought into pressure contact with the surface of the cylindrical member by the juxtaposed transportation belts and are then carried on the juxtaposed transportation belts. The tension applied to each transportation belt is decreased in the direction from the central portion to each side portion of the juxtaposed transportation belts.

4 Claims, 4 Drawing Figures

SHEET TRANSPORTATION BELT APPARATUS

BACKGROUND OF THE INVENTION

The present invention relates to a belt apparatus for transporting a sheet and more particularly to a sheet transportation belt apparatus of the type in which a plurality of transportation belts are juxtaposed in the width direction of sheets to be transported, such as photosensitized paper, image transfer sheets, and original sheets in copying machines.

In diazo copying machines in which an original sheet to be copied and a photosensitized paper are superimposed and exposure is performed by passing the superimposed original sheet and photosensitized paper over a light source, a sheet transportation belt apparatus is usually employed for transporting the superimposed original sheet and photosensitized paper to an exposure station. Generally, the sheet transportation belt apparatus for use in such copying machines comprises a plurality of sheet transportation belts, which are juxtaposed and trained over a plurality of rollers, and an exposure cylinder, such as a glass cylinder having a light source therein, is disposed between the rollers in such manner that the other peripheral surface of the exposure cylinder is in pressure contact with the transportation belts, whereby an exposure area is formed in the contact portion between the exposure cylinder and the transportation belts, where the superimposed original sheet and photosensitized paper are tightly held for exposure.

In such apparatus, however, a uniform tension is not always applied to each transfer belt, and accordingly each transfer belt is not always in uniform pressure contact with the outer peripheral surface of the exposure cylinder due to the production errors of the transportation belts, the rollers for supporting the transportation belts, tension rollers and exposure cylinder. Under such circumstances, a force having a lateral component with respect to the superimposed original sheet and photosensitized paper is applied to the superimposed original sheet and photosensitized paper. As a result, the original sheet is shifted from the photosensitized paper and, in particular when the photosensitized paper is a roll paper, the paper may become wrinkled.

SUMMARY OF THE INVENTION

It is therefore an object of the present invention to provide an improved sheet transportation belt apparatus which does not cause irregular variation of tension to be applied to each transportation belt even if there were production errors in the transportation belts, the exposure cylinders or other members which constitute the sheet transportation belt apparatus, eliminating the disadvantages of the conventional sheet transportation belt apparatus.

A sheet transportation belt apparatus according to the present invention comprises a plurality of transportation belts juxtaposed in the width direction, and the object of the present invention is attained by applying a greater tension to the central transportation belts than any of the other transportation belts and the tension applied to the other transportation belts is decreased in the direction from the central portion to each side portion of the juxtaposed transportation belts.

According to such arrangement of the transportation belts, a tension gradient is applied to the transportation belts in such manner that the tension of each transportation belt is weakened in the direction from the central portion to each side portion of the juxtaposed transportation belts. Therefore, even if there were variations in the length of each transportation belt or in the accuracy of the cylindrical work of the exposure cylinder, the tension of each transportation belt would not be varied irregularly.

DETAILED DESCRIPTION OF THE PREFERRED EMBODIMENT

Generally, in an apparatus in accordance with this invention comprising a plurality of juxtaposed transportation belts trained over a plurality of guide rollers, in order to change the tension to be applied to each transportation belt in such manner that the tension is decreased in the direction from the central portion to each side portion of the juxtaposed transportation belts, there may be three methods as follows:

In the first method, the diameter of at least one roller is changed so as to be the greatest in the central portion of the roller and to be decreased in the direction from the central portion to each end portion of the roller step by step, and a plurality of endless transportation belts, each of which is substantially the same in the length and thickness and width and material, are trained over the roller.

In the second method, a plurality of the guide rollers having uniform diameters are used, but the transportation belts to be trained over the guide rollers are different, which are juxtaposed in such manner that the shortest transportation belt is disposed in the central portion of the rollers and in the direction from the central portion to each end portion of the rollers, the longer transportation belts are trained over the rollers.

The third method is the combination of the above-mentioned first and second methods.

The present invention covers the above-mentioned three methods.

Figure 1:
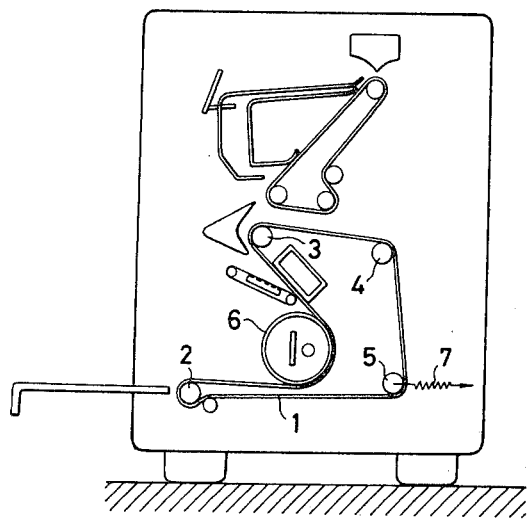
FIG. 1 shows schematically a diazo copying machine in which a sheet transportation belt apparatus according to the present invention is employed.
Figure 2:
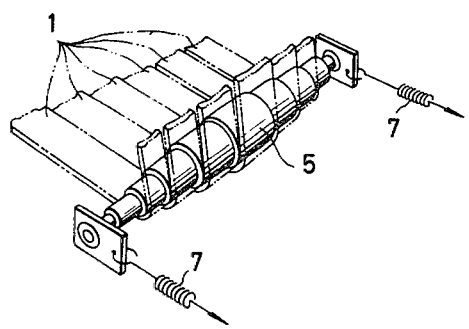
FIG. 2 is a partial perspective view of a main portion of the sheet transportation belt apparatus of the present invention.
Figure 3:
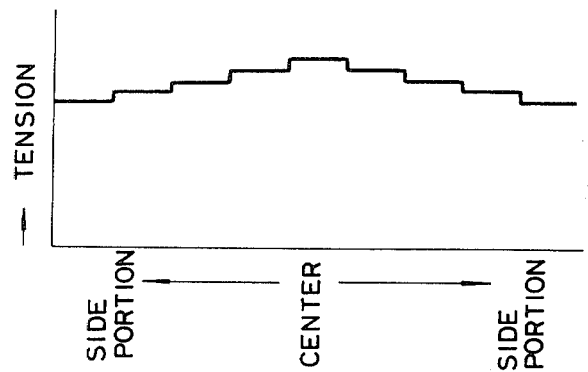
FIG. 3 is a graph showing the tension of each transportation belt of the sheet transportation belt apparatus of the present invention.

Referring to FIGS. 1, 2 and 3, an embodiment of the above-mentioned first method will be explained.

In FIG. 1, there is schematically shown a diazo copying machine in which a sheet transportation belt apparatus of the present invention is employed. The diazo copying machine has a plurality of endless transportation belts 1 therein and each of the transportation belts 1 is trained over four guide rollers 2, 3, 4 and 5 and between the guide roller 2 and the guide roller 3, there is disposed an exposure cylinder 6 in such manner that the peripheral surface of the exposure cylinder 6 is slidably in contact with the transportation belts 1, so that an exposure area is formed between the transportation belts 1 and the peripheral surface of the exposure cylinder 6, where the superimposed original sheet and photosensitized paper are carried in close contact with the peripheral surface of the exposure cylinder 6. The guide roller 5 is urged in the direction of the arrow by spring means 7, whereby tension is applied to the transportation belts 1.

As illustrated in FIG. 2, the guide roller 5 has the greatest diameter in the central portion thereof and, from the central portion to the opposite end portions, the diameter is made smaller step by step and the diameter is the smallest at each end portion of the guide roller 5.

By such a design of the guide roller 5, the greatest tension is applied to the transportation belt at the center of the belts 1, and the tension of the belts 1 becomes smaller in the opposite directions of the guide roller 5. FIG. 3 shows the distribution of the tension of the belts 1.

As a result, pressure, whose magnitude is distributed as shown in FIG. 3, is applied to the superimposed original sheet and photosensitized paper from the back side thereof, which are fed between the belts 1 and the exposure cylinder 6, whereby any stress which might be generated on each surface of the superimposed papers is led to the opposite sides thereof and formation of wrinkles on the surface is prevented.

In the above-mentioned embodiment of the present invention, the diameter of the guide roller 5 is varied in the respective portions of the roller 5. However, the present invention is not limited to this, but as mentioned previously, by changing the length of each transportation belt, the tension applied to each transportation belt can be adjusted.

Figure 4:
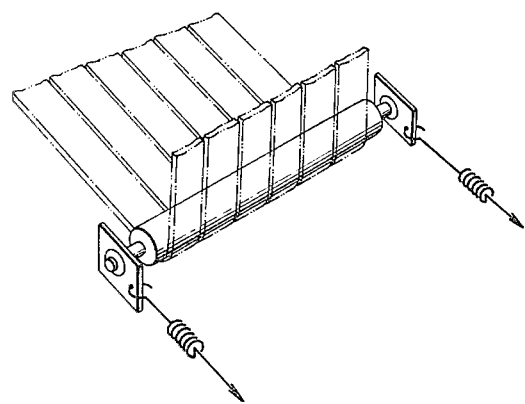
FIG. 4 is a view similar to FIG. 2 but showing another embodiment of the present invention.

FIG. 4 illustrates the embodiment in which guide rollers of uniform diameter are used, but in which the tension gradient is applied by use of belts of differing length. More particularly, the belts, each of which is substantially the same in thickness, width and material, are arranged so that the central belts are shorter in length than the other belts. The other belts increase in length in the direction from the central portion to each end portion of the rollers.

While specific embodiments of the invention have been shown and described in detail to illustrate the application of the principles of the invention, it will be understood that the invention may be embodied otherwise without departing from such principles.

What is claimed is:

1. In a sheet transportation apparatus comprising:
a plurality of juxtaposed transportation belts trained over a plurality of guide rollers and a cylindrical member for transporting sheets between said juxtaposed transportation belts and said cylindrical member, the improvement comprising tension gradient application means for applying a different tension to each of said transportation belts in such manner that the greatest tension is applied to the central transportation belts and, in the direction from the center to each side portion of said juxtaposed transportation belts, the tension applied to said transportation belts is decreased, wherein said tension gradient application means comprises at least one roller member which constitutes one of said guide rollers and which has a plurality of discrete portions each having a diameter different from the adjacent portions, said diameters being decreased in the direction from the central portion to each end portion of said roller member, and said juxtaposed transportation belts each being substantially the same in length, thickness, width and material.

2. In a sheet transportation apparatus comprising:
a plurality of juxtaposed transportation belts trained over a plurality of guide rollers and a cylindrical member for transporting sheets between said juxtaposed transportation belts and said cylindrical member, the improvement comprising tension gradient application means for applying a different tension to each of said transportation belts in such manner that the greatest tension is applied to the central transportation belts and in the direction from the center to each side portion of said juxtaposed transportation belts, the tension applied to said transportation belts is decreased, wherein said tension gradient application means comprises at least one roller member which constitutes one of said guide rollers and which has a uniform diameter and said juxtaposed transportation belts, each of which is substantially the same in the thickness, width, material and whose central transportation belts are shorter than other transportation belts, each of which is increased in the length in the direction from the central portion to each side portion of said juxtaposed transportation belts.

3. A sheet transportation apparatus of claim 1, wherein said roller member is urged in the direction normal to the axis of said roller member by spring means so as to give more tension to said transportation belts.

4. A sheet transportation apparatus of claim 2, wherein said roller member is urged in the direction normal to the axis of said roller member by spring means so as to give more tension to said transportation belts.

* * * * *